United States Patent Office 3,203,458
Patented Aug. 31, 1965

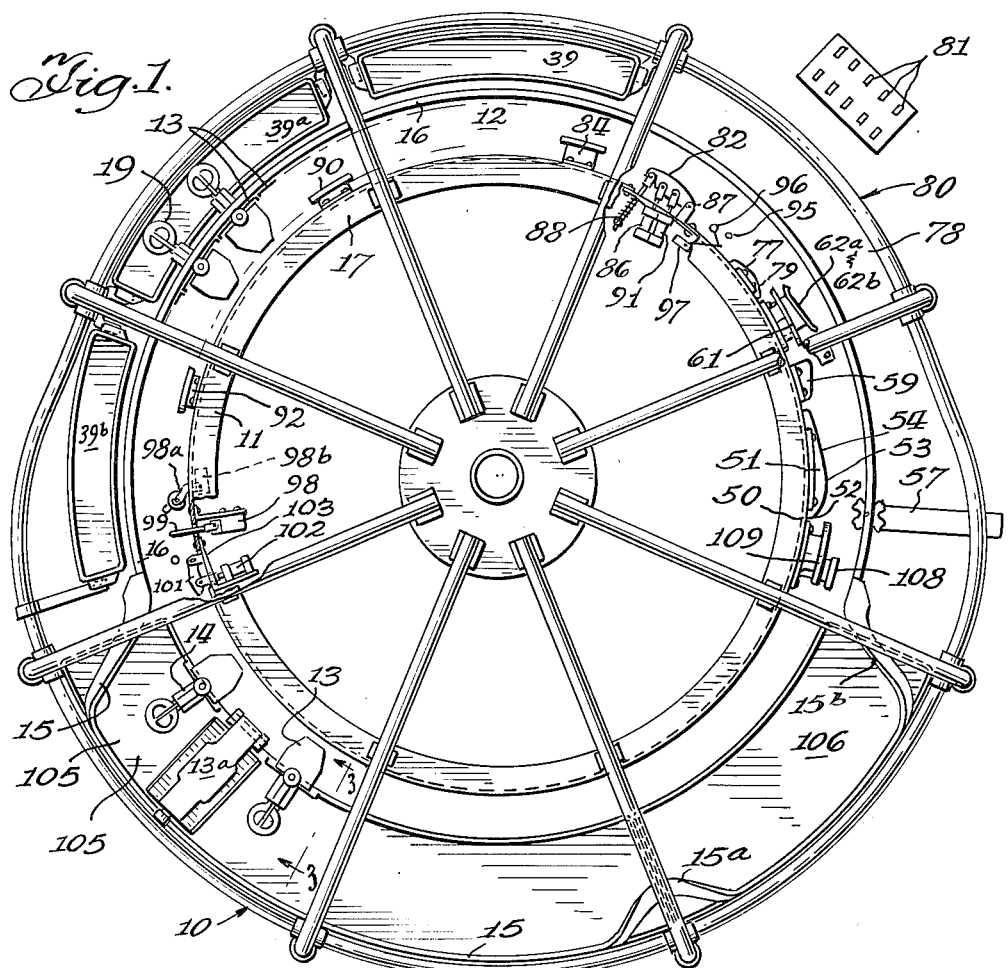

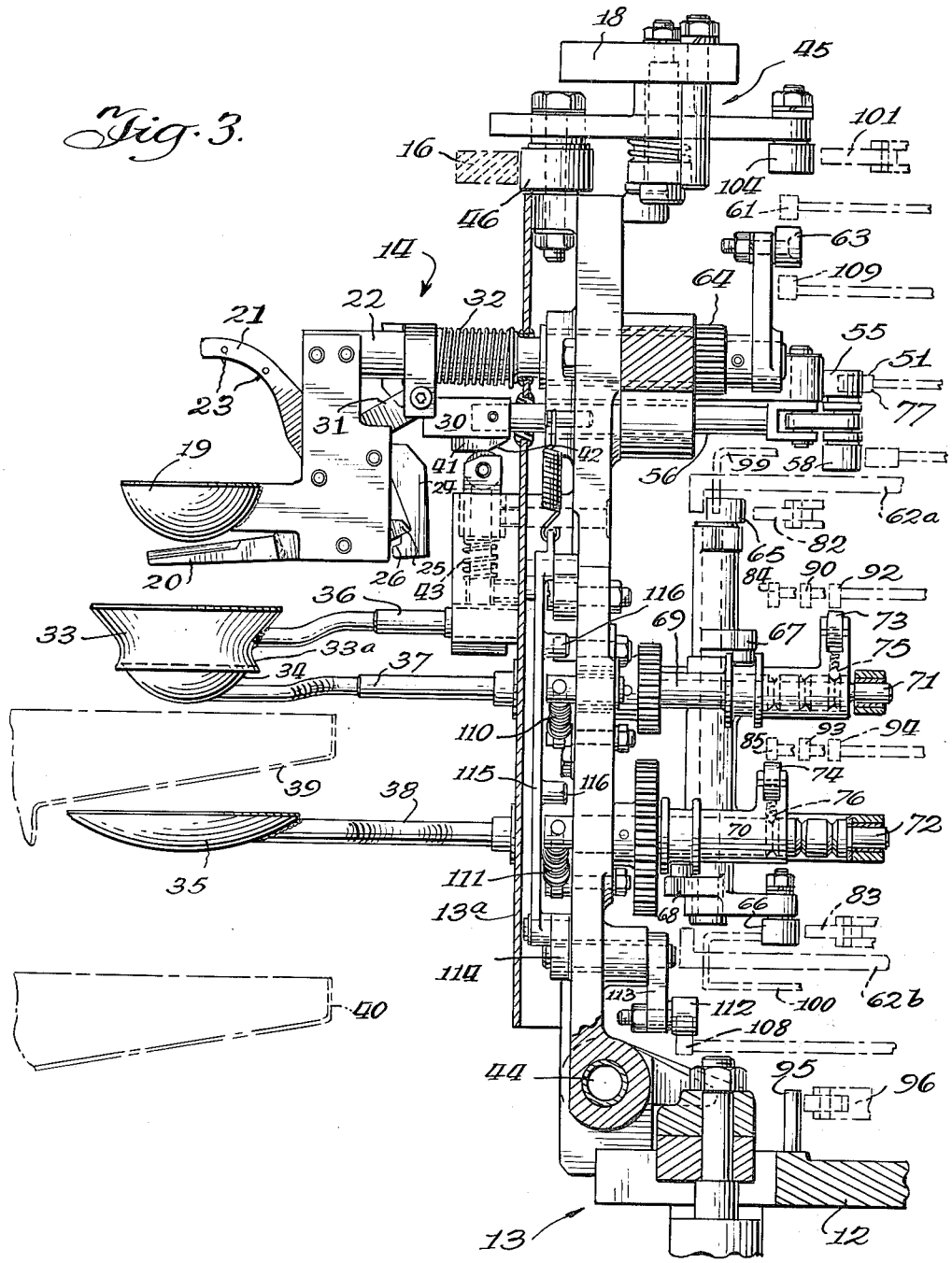

3,203,458
EGG OPENING AND SEPARATING METHOD
Leonard Shelton, Omaha, Nebr., and Kenneth G. Jones and Robert G. Bush, Green Bay, Wis., assignors, by direct and mesne assignments, to Continent Egg Corporation, Chicago, Ill., a corporation of Illinois
Filed Nov. 24, 1961, Ser. No. 154,718
2 Claims. (Cl. 146—221)

The present invention relates to a method of processing eggs and egg products and more particularly to a method of cutting eggs, handling the egg products for classification, blending and separation thereof selectively and sanitizing the equipment to perform the method, automatically.

Egg processing has been primarily a manual task, even though a great deal of emphasis has been placed on attempts to mechanize and automate the industry. Many of the problems involved with the development of equipment originate with the fragile character of the eggs in terms of both fragile shells and weak or fragile yolks, and with the wide diversity of the character of eggs in many physical ways including solids content which will vary from season to season as well as from hen to hen.

The fragile character of the shells requires that the clamping of the shell for the purpose of cutting the same be firm, yet gentle; that the cutting of the shell be sharp but not so severe as to shatter the same; and that the opening of the shell be so effectively conducted that shell fragments do not break from the remainder of the shell and fall with the egg yolk, egg white, or whole egg.

The fragile nature of the yolk requires that the emptying of the egg shell be effected so smoothly and gently that the yolk does not break and mix with the white when attempting to separate the white and yolk.

Regarding the diversity in eggs, and their physical characteristics, they vary considerably as to size, as to yolk color, as to solids content, and as to quality. Also, in normal handling and packing procedures, some of the egg shells are occasionally broken or cracked, but not so severely that all of the contents run from the shells of these cracked eggs.

The egg products industry has used manual breaking and semi-automatic separating methods so that the various problems can be overcome by the use of human judgment. Manual operations, however, as is well known, are relatively slow. For example, an experienced egg breaker can break and separate about twenty cases of eggs per day. A machine operating in accordance with the method of the present invention may operate at much higher rates than human egg breakers. The embodiment of the invention shown in the drawings is operative at a rate of about two hundred cases per eight-hour day.

The limit of the egg breaking and separating rate of operation of the machine is determined only by the limit of speed of operation of the mechanism, the number of egg breaking and separating units that the machine as a whole may carry and by the effective speeds of the control operator who performs the selection functions and codes each breaking and separating unit on the machine when inspecting the eggs being handled thereby.

Commercial factors have created other problems in this field. By governmental regulation, separated egg yolks, which are egg yolks that have been at least partially separated from the egg whites, may be called "yolks" only when the product includes at least 43% egg yolk solids which are primarily fat. Egg products including egg yolks and egg whites which have less than 43% egg yolk solids are called blended eggs and can not be sold as "egg yolks." While there are many uses and a substantial commercial market for blended or mixed eggs as well as finely separated yolks and whites or albumen, the price that is commanded for egg yolks is substantially higher than that which can be obtained from mixed eggs or whites. Thus, if the eggs in a particular batch have a higher-than-required solids content in the yolk, then a substantial commercial loss would be experienced to sell the egg yolk therefrom with the extra solids content, at the price of egg yolks having only the required or minimum content. In accordance with the present invention, however, eggs may be blended automatically and easily to finely controlled specific solids contents.

Similarly, by the method of this invention, dark or other special yolks which command a higher price, or whole eggs, may be separated as to color and as to solids, etc.

Another advantage of the present invention is that it permits the washing of individual egg breaking and separating units, selectively, depending upon the nature of the products handled thereby and the particular character of the individual egg last handled. That is, if one of the numerous units on the machine happens to break and open an inedible egg, only that unit need be washed. This can be effected without shutdown of the machine or interrupting its operation in any way. The entire machine may continue in operation and the other units handling good eggs will not be washed unless washing thereof is desired, whereby there is no loss of egg products on those units. Moreover, all of the units may be washed without shutdown or interruption of the machine.

Numerous other features and advantages of the present invention will become readily apparent from the following detailed description of the present invention and from the drawings in which each and every detail shown is included as a part of this specification, in which like reference numerals refer to like parts, and in which:

FIGURE 1 is a plan view of an egg breaking, blending and separating machine operative with one or a plurality of units for egg breaking and separating or otherwise handling the egg products;

FIG. 2 is an enlarged fragmental perspective view of an individual unit with selected egg product cups projecting from the face thereof; and FIG. 3 is a further enlarged vertical sectional view of an egg breaking and separating unit taken substantially along the lines 3—3 of FIGURE 1 and includes therein, in phantom lines, the cams on the drum of the machine in FIG. 1 in their relative operating position with respect to the cam followers on the egg breaking and separating unit.

The machine shown in the drawings is an illustrative embodiment of a machine operative in accordance with the method of the present invention for processing eggs and egg products. The salient structural components of the machine are a supporting structure 10 carrying a fixed cam support or drum 11 and a rotatable carrier 12 which is driven by an appropriate drive mechanism on the support structure but not shown herein. A plurality of individual egg breaking and separating units 13, each having an egg breaking head 14 are mounted on the carrier. Although any desired types of support structure and carrier may be employed in embodiments of this invention, the mechanism herein shown and described includes an annular framework peripherally carrying a track 15 and a safety rail 16 near the outer and upper peripheral regions thereof. Centrally thereof, the support structure carries a drum 17 below which there is located the drive mechanism connected to controllably drive the lower egg breaking and separating units supporting ring 12, and an upper latch ring 18 seen in FIG. 3.

It should be understood that the method of the invention is not limited to the particular structural arrangement described, inasmuch as the method may be performed by units traveling in any desired manner compatible with performance of the method and capable of performing the necessary functions.

The mechanism as shown in the drawing is segmented functionally into a plurality of operating stations for effecting various egg product handling steps as the egg breaking and separating units pass those stations.

With particular reference to FIGS. 2 and 3, each egg breaking and separating unit 13 with its individual egg breaking head 14 is arranged to pass each of the operating stations of the machine to accept an egg fed thereto, clamp the egg, cut the shell, empty the shell of its contents, either separate the yolk from the white or accumulate the whole egg or mixed egg contents, selectively dump the egg product containers at specified stations for the accumulation of egg yolks, special yolks such as "dark yolks," indible yolks, eggs whites, whole eggs, mixed eggs and inedible whites, and then be selectively washed depending upon the nature of the egg products handled thereby.

The egg breaking and separating head and the manner in which it operates, although described in substance below, is described in detail in the co-pending application of Leonard Shelton, Ralph N. Beebee and Thaddeus J. Tworek, Serial Number 143,850, filed October 9, 1961, now U.S. Patent No. 3,111,150, and entitled "Egg Breaking Head."

The egg breaking head 14 has a pair of egg receiving cup halves 19, a pair of shell cutting knives 20 and a pair of clamping fingers 21 mounted in cooperative sub-assemblies, each including a cup half, a knife and a clamping finger. Each sub-assembly is mounted for rotation about the axis of its individual mounting shaft 22.

With the fingers 21 in a raised position as shown in FIG. 3, an egg is fed into the cup halves while the cup halves are disposed in closed proximity to each other as shown in FIG. 2. The clamping fingers 21 are then lowered onto the egg shell so that the holding points 23 thereon engage the shell and firmly hold the egg in position in the cup halves for cutting. The points preferably do not pierce the egg shell, but instead settle into valleys on the surface of the shell.

When the egg is firmly clamped in place between the fingers and the cup half, the latches 24 for the knives 20 are tripped to move the lower ends of the latches rearwardly in such a manner that the rearward end 25 of each of the knives is resiliently biased and moved to the lower step 26 on the latch cooperating therewith. The knives pivotally move upwardly a pre-set, limited distance to sharply cut the egg shell without shattering the same and without cutting or otherwise rupturing the yolk of the egg.

The lowering of the clamping fingers 21 and the tripping of the knife latch 24 are effected by controlled movement of a control block 30 cooperatively arranged with the linkage 31 for the clamping fingers and knives. The forward movement of the control bar 30 is cam controlled while the linkage and clamping fingers are normally biased in a downward direction by springs 32.

Forward movement of the control block 30 permits the clamping fingers to descend upon the egg under the influence of the springs 32 with a lost motion relation between the linkage and the control bar in the forward direction of movement thereof.

As the control block 30 moves to its forwardmost position, it trips the knife latch for operation of the knife in the manner described above.

Following cutting of the egg shell, the egg breaking sub-assemblies are pivoted outwardly about their respective axes to empty the contents of the shell into an appropriate container for accepting whole eggs or appropriate containers for accepting the egg white and the egg yolk. If the egg white and egg yolk are to be separated, the contents of the shell are emptied therefrom into containers as shown in the drawings including a funnel and clipper 33, yolk cup 34 and a white or albumen cup 35. These cups and the funnel are mounted on posts or arms 36, 37 and 38 for controlled movement thereof. The arms 37 and 38 to which the yolk cup and the white cup are attached, are mounted in the mechanism for rotation and dumping the contents thereof into appropriate catch pans or basins 39 and 40 at properly spaced positions about the periphery of the machine. The funnel or clipper arm 36 is mounted on the face of the machine for reciprocation for cooperation of the clipper portion 33a of the funnel with the upper edge of the yolk cup 34.

As the control block 30 is reciprocated, the lower surface thereof operates as a cam 41 and is followed by a roller 42 mounted on a follower mechanism connected to the arm 36 and arranged for vertical reciprocating movement under the influence of a biasing spring 43.

The contents of the egg flow through the wide mouth funnel and are directed thereby to the yolk cup 34. The mouth of the funnel is specially arranged to be so wide that the yolk falling from the egg shell will not fall upon the edge of the funnel; and the neck of the funnel is arranged to be so small that the yolk will not fall upon the edge of the yolk cup. During normal egg shell emptying operations some of the white or albumen will precede the yolk so that it will lubricate the surface of the funnel and run into the bottom of the yolk cup before the yolk arrives in the position whereby falling movement of the yolk is cushioned and lubricated. Much of the white will overflow into the white cup 35 when the yolk and white run into the yolk cup 34. But some of the egg white will cling to the yolk and to the yolk cup. Reciprocating movement of the funnel and clipper for engagement of the inner surface of the clipper portion 33a with the upper edge of the yolk cup 34 will clip off or cut the egg white that hangs onto the egg yolk or remains at the edge of the yolk cup by surface tension.

The amount of egg white which can be removed from the yolk and caused to fall into the white cup 35 may be increased by vertical oscillation of the clipper and repeated clipping action thereof before emptying the yolk cup. In accordance with this invention, the method of oscillating the clipper to decrease the proportion of white clinging to the yolk or hanging onto the yolk cup may be effectively practiced by cam controlling the inward and outward movement of the control block 30 or by contour control of the cam surface 41 on the control block 30.

If it is desired to catch whole eggs rather than to separate egg yolks and egg whites with respect to any breaking, blending and separating head unit of the machine, the funnel and clipper, and the yolk and white cups may be removed and a whole egg cup may be substituted for either the yolk cup 34 or the white cup 35 as desired. Under ordinary blending circumstances, the whole egg cup would be substituted for the yolk cup 34 rather than for the white cup 35, inasmuch as such a substitution would be effected for the purpose of adding a limited quantity of egg white to separated egg yolk. However, it should be appreciated that such a substitution may be made for any desired purpose and that substitution may be made at any number of units about the machine or even all such units if it is desired to accumulate whole eggs.

Following the cutting, opening and emptying of the egg shell and releasing of the egg shell for dumping the same by withdrawal of the control block 30 to withdraw the clamping fingers 21 from the shell portions and following clipping in the event that separating is desired, the egg contents are emptied into the pans 39 and 40 at appropriate stations about the machine in a selective manner. For example, the successive yolks may be separated as light or regular yolks, dark or other special yolks, and such yolks as are known as "inedible yolks." "Inedible yolks" are yolks that may be partially spoiled or contain blood spots, etc. Most of these may be used in animal food products. Similarly, selective emptying of the white cups 35 at selected stations of the machine during the course of travel of the unit, may be effected to separate good egg whites, mixed eggs, and egg whites known as "inedibles" which may be partially spoiled or contain blood spots, etc. These emptying operations for the yolk cup and the white cup, and for whole egg cups when the same are employed, are effected by rotation of the arms 37 and 38 which are cam controlled from mechanisms in the back of each unit and by cams mounted on the drum 11.

When the emptying operation has been completed, selective heads may be washed, rinsed, sanitized and dried or all of the heads may be so treated, as desired, without interruption of the operation of the machine in accordance with the method of this invention. For this purpose, each of the units is pivotally mounted as at 44 on the rotating support ring 12 and held in an upright position by a cam controlled latch mechanism 45 carried by the rotating latch ring 18. When the latch mechanism 45 is operated it releases the unit so that the roller 46 at the upper end of the unit rides on a surface of the safety ring 16 and a wash track 15. As seen in FIG. 1, the wash track 15 is so contoured as to cause a unit to be lowered to a horizontal position as indicated by the unit 13a in the lower left hand portion of FIG. 1, and to rise in successive areas so that all of the egg contacting elements, but only the egg contacting elements, will be washed, rinsed, sanitized and dried. At the end of these phases of operation, the track carries the mechanism back to its fully raised position where the spring biased latch catches and holds the unit in its upright position. At this stage the machine is then re-prepared to accept an egg and proceed through its cycle of operation anew.

Washing, etc., is necessary whenever an egg of inedible contents is handled. In machines following heretofore known methods of automatic handling, it was necessary to stop the machine or remove the portion of the machine handling such an egg from the machine. It was also necessary to fully stop the machine whenever it was desired to wash down all of the egg handling devices. In addition, when portions of the machine handled eggs wherein the yolk were broken, so that mixed eggs resulted, it was also necessary to remove those portions of the machine to effect washing thereof. It will be readily observed that following the methods of the present invention, individual units may be separately washed or the units may be successively washed during ordinary cycling of the machine without any interruption of the movement and cycling operation thereof.

The stages of operation of the mechanism following the method of this invention and the operation of the mechanism contained in each of the individual units may be understood most conveniently by juxtaposing FIGURES 1 and 3. The operation will be explained assuming a starting position indicated generally at 50 and with the units of the machine arriving at the point 50 on FIG. 1 in such condition that the head subassemblies are in the closed position so that the cup halves form a complete cup.

From this starting position the units move in a counterclockwise direction as viewed in FIG. 1 at a rate controlled by the drive of the machine. The first operation effected is controlled by the movement of the mechanism into engagement with a clamping finger opening cam 51 having a rapid rise 52, a dwell portion 53 and an elongated dropoff 54. The cam 51 is engaged by a follower 55 attached to a pivot linkage and reciprocating shaft 56 which is connected to the control block 30. This arrangement is so oriented that as the follower 55 rides on the rise 52 toward the dwell 53, the control block 30 is withdrawn to raise the clamping fingers 21 and set the knife latches 20. The mechanism is held in this condition as it passes along the dwell 53, during which time it passes a feeder 57 of any appropriate type and design which deposits the egg in the cup formed by the closed cup halves 19. The feeder 57 may be driven in any desired manner such as by an independent motor or by a takeoff from the main drive of the machine. And it may be synchronized with the passage of units past the same in any convenient manner, such as by trip means operated from a portion of each unit as the same passes the feeder.

With an egg in the closed cup halves, the unit continues its counterclockwise travel so that the follower 55 rides on the descending face 54 of the cam 51 under the influence of clamping finger biasing springs 32, to permit the fingers 21 to close down upon and clamp the egg.

At the next stage of movement of the machine, a follower 58 engages a short knife tripping cam 59 on the drum 60. The follower 58 is so arranged on the linkage and reciprocating shaft 56 for the control block 30 that as it rides the cam 59, the block 30 trips the knife latch 24 to cut the egg shell. By the arrangement of the steps in the knife latch 24, penetration of the knife 20 into the shell between the opposed, clamped portions of the shell held by the individual sub-assemblies, is limited so that the sharp movement thereof which cleanly cuts the shell does not break the surface membrane on the yolk.

Following the cutting action, as the machine continues its counterclockwise movement, the unit passes a cam 61 and a dual set of cams 62a and 62b. The cam 61 is the head opening cam and the dual cams 62a and 62b are the code reset cams. The head opening cam 61 is engaged on its undersurface by a follower 63 mounted at the end of a crank arm on one of the shafts 22, the other shaft being connected thereto for symmetrical movement by intermeshing gears 64. As the follower 63 passes under the cam 61, the crank arm is rotated so that the head sub-assemblies partially rotate to an open position to empty the egg shells and separate the egg contents including the yolk and the white from the shell.

As noted hereinabove, the egg contents fall from the shell either through a funnel 33 into the yolk cup 34 and the white cup 35 or into a whole egg cup as selectively desired.

At the same time that the head sub-assemblies are being opened, a pair of followers 65 and 66 are engaging the dual code reset cams 62a and 62b, respectively. The cams 62a, 62b are hook like cams that are engaged along their inner surfaces. These followers are mounted on pivot cranks having arms 67 and 68, respectively, connected to slide shafts 69 and 70, respectively. The slide shafts are mounted on the carrier shafts 71 and 72 which support and rotate the yolk cup 34 and the white cup 35, respectively. The slide shafts 69 and 70 carry cam followers 73 and 74, which, when engaged by appropriate cams, rotate the shafts 71 and 72 for emptying of the cups 34 and 35.

Each of the followers is arranged to be engaged by one of a plurality of selected cams dependent upon the character of the blending operation being conducted by the machine and the character of the particular egg as inspected by the operator. Three such cams, described in greater detail hereinafter, are shown for engaging each of the followers 73 and 74. The slide shafts are movable to selected positions for selective operation of the shafts 71 and 72 by operation of cams movable in accordance with operator operation effected at the inspection station.

When the operator makes a selection for each of the slide shafts, the slide shafts are moved to an appropriate position and held in that position by detents 75 and 76. This position is retained after the operator selection until the unit reaches and passes the code reset cams 62a and 62b. These cams return the coding mechanisms and the slide shafts to their starting positions as shown for the slide shaft 70.

With the mechanism coded to a neutral or starting position and the egg contents emptied from the shell into a yolk cup and white cup, or into a whole egg cup, the mechanism passes to a finger opening, shell dropping and white clipping cam 77 shown individually in FIG. 1, but as congruent with the cam 51 in FIG. 3. This cam is engaged by the follower 55 which, operating through the shaft 56 and control block 30, causes the fingers 21 to lift thereby un-clamping and dropping the opposed egg shell portions from each of the head sub-assemblies. The shells are dropped into a disposal pan 78 for removal or further processing as may be desired.

As the follower reaches the maximum height and dwell portion 79 of the cam 77, the cam surface 41 on the control block 30 operates against the follower 42 to cause the upper edge of the yolk cup 34 to be borne down upon by the clipping portion 33a of the funnel 33 to effect clipping. The well portion 79 of the cam 77 may have an extended length with a corrugated or serrated configuration to cause longitudinal oscillation of the shaft 76 and reciprocation of the clipper for multiple-stage clipping of egg white from the egg yolk as discussed above, if so desired. Of course, the same multiple clipping effect may be obtained by the provision of a plurality of cams similar to the cam 77, if so desired.

As the unit 13 leaves the cam 77, having dropped the egg shells and having clipped the egg white, it passes an operator station 80 where the operator of the machine inspects the egg products and egg contents. The operator looks to determine, for example, whether the yolk is good or bad and whether it is dark or light, whether the white is good or bad and whether it has broken yolk therein. After making this determination she presses appropriate control buttons 81 on the panel board before her if the egg product cups are to be dumped at a subsequent station other than the first dumping station. If no buttons are pressed the egg cup or cups will be dumped at the first station which is arranged to take good yolks and good whites or whole eggs if it is desired to dump whole eggs.

Two of the control buttons 81 control selective positioning of the slide shaft 69 for dumping the contents of the yolk cup at either of the two positions other than the first dumping position and two of the buttons 81 similarly control the slide shaft 70 for controlled dumping of the contents of the white cup 35.

The direct control effected by the buttons 81 is on an electro-pneumatic system effective to operate a pair of pivotally mounted cams 82 and 83 which are disposed with one directly above the other. Only the cam 82 appears in the plan view of FIG. 1.

As the unit 13 progresses through the operator inspector station 80 with the egg products in the cups, it approaches the cams 82 and 83. If the operator has not pressed any of the four control buttons for effecting movement of the cams 82 and 83 to controllably position the slide shafts 69 and 70, the unit will progress past the cams 82 and 83 without engaging the followers 65 and 66 on the cranks which are connected to the slide shafts 69 and 70. The unit will then progress, to a pair of first dumping cams 84 and 85 which are disposed in vertical alignment with only the upper cam 84 appearing in FIG. 1. Under such conditions, rollers 73 and 74 will engage the undersurfaces of cams 84 and 85 and cause the slide shafts 69 and 70 splined to shafts 71 and 72 respectively to rotate and thereby rotate the cups 34 and 35 for emptying the egg product contents of the cups into the pans 39 and 40, respectively.

If the operator determines, for example, that the yolk is a dark or otherwise special yolk, she may press a selected one of the buttons 81 which will cause a solenoid operated valve to be energized to admit air to a cylinder 86 having the piston thereof connected to the cam 82 near the free end of the cam opposite to its pivotal mounting connection 87 to the drum 11. The piston operates against a spring 88 which normally biases the cam 82 inwardly to the neutral position shown in FIG. 1, and shown for the cam 83 in FIG. 3.

Actuation of the cylinder 86 causes the cam 82 to be moved radially outwardly a preset amount so that the follower 65 will engage the same to move the slide shaft 69 to its second operating position such that the follower 73 will miss the cam 84 but be engaged by a second yolk dumping station cam 90 whereby the yolk cup will not be dumped at the first dumping station, but will be dumped at the second dumping station to dump the yolk therein into a yolk receiving pan 39a below which there is a second white dumping pan, not shown.

If the operator determines that the yolk is a bad yolk, either by virtue of it being spoiled or having blood spots therein or otherwise being classified as an inedible yolk, she may press another one of the selected buttons 81 which causes energization of a solenoid operated valve for operation of the cylinder 91. The piston of cylinder 91 is connected to the cam 82 at a point closer to the pivot 87 than the connection of the piston of the cylinder 86 to the cam 82. The strokes of the cylinders 86 and 91 are substantially the same in the mechanism shown in the drawings. Thus, actuation of the cylinder 91 causes the cam 82 to be moved radially outwardly a distance greater than the distance that the cam was moved by actuation of the cylinder 86.

When the cam is moved by the piston of cylinder 91, the cam 82 and follower 65 on the crank for the slide shaft 69 will be moved to the position shown in FIG. 3. This moves the slide shaft to its third operating position wherein the follower 73 will miss both the cam 84 and the cam 90 and ride under and engage the third yolk dumping cam 92 for dumping the yolk in the cup 34 in an inedible yolk pan 39b at a third dumping station.

The two control buttons for the white dumping cam 83 similarly control an identical actuating arrangement for the cam 83 to control positioning of the slide shaft 70 so that the follower 74 may be selectively positioned to engage either the cam 93 disposed below the cam 90 at the second dumping station, as for egg whites with broken yolks or mixed eggs, or a cam 94 disposed below the cam 92 for dumping of bad whites or otherwise affected whites classified as inedibles.

As the next unit 13 approaches the control cams 82 and 83 and the operator inspection station 80, the electro-pneumatic system is reset for operator control and selectivity of dumping of the egg products held by that unit. This is done by means of a pin 95 which engages the actuator arm 96 on a control switch 97 for the valves operating the cylinders 86 and 91 for cam 82 and corresponding cylinders for the cam 83 to exhaust the same to permit the biasing spring 88 and the corresponding spring for the cam 83 to return the cams 82 and 83 to their normal positions as shown in FIG. 1 and as shown for the cam 83 in FIG. 3. The mechanism is then in condition for the operator to re-operate the controls for the cams 82 and 83 for selective positioning of the dumping control slide shafts 69 and 70 of the second or next unit 13. The electro-pneumatic system is so arranged that when the operator presses one of the buttons for controlling the cylinders operating the cams 82 and 83, the system will remain actuated and hold the cylinder in the desired position until the reset switch 97 is operated by engagement of the pin 95 with the actuator arm 96.

When the unit 13 passes the selective dumping station over the pans 39, 39a, and 39b and the corresponding white dumping pans, it approaches the washing, rinsing and sanitizing stations. The system and the mechanism are so arranged to follow the method of this invention that unless a special head washing button among the control buttons 81 is pressed, the egg contacting elements of the unit will be washed only if the unit was coded or set for dumping bad yolks in pan 39b or for dumping mixed eggs or bad whites at the second and third stations. As the unit 13 approaches the washing station, it also approaches a set of latch trip operating switches 98 with operating arms 99 and 100, respectively, and a latch trip arm 101. The switch arm 99 is shown in greater detail in FIG. 3 wherein it is shown that it is arranged with a dependent portion disposed to be engaged by the follower 65 on the crank for the control slide shaft 69 only when the follower 65 has been moved to its third dumping position by the cam 82, which position is the inedible yolk position. When the mechanism is in that position, the follower 65 will engage the arm 99 to operate the switch 98 and the switch will energize a solenoid controlled valve for a cylinder 102. The piston of cylinder 102 is connected to the free end of the latch trip cam 101 which is pivotally connected to the drum 11 at 103. When the latch trip cam 101 is extended by this arrangement, it will be engaged by a follower 104 to trip the latch 45 thereby freeing the unit for the roller 46 on the upper end thereof to ride on the safety rail 16 and the track 15 as the unit pivots forwardly and downwardly by gravity about its mounting 44.

As the unit 13 rides along the track 15, it is lowered and raised so that all of the egg contacting portions thereof in front of the face plate 13a dip into and are raised out of a washing pan 105 and rinsing, sanitizing, and drying pan 106. The washing pan may contain appropriate washing solutions and the washing solution may be ultrasonically energized for high efficiency cleaning. Within the pan 106 there may be appropriate spraying and blowing pipes and mechanisms.

The same operations are effected if the switch arm 100 is engaged by the follower 66 on the crank for the white cup control slide shaft 70 at the lower portion of the unit, as illustrated in FIG. 3. The arm 100, however, has an elongated portion for engagement by the follower 66. The arm 100 will be engaged to trip a switch 98 or an equivalent counterpart thereof for actuation of the cylinder 102 whenever the slide shaft 70 is in position for dumping the white cup at either the second or the third dumping station. That is, if the cam 83 is energized to move the follower 66 and slide shaft 70 to either of the second or third positions when the unit passes the dumping coding stations, the follower 66 will engage the arm 100 of the switch system controlling the cylinder 102 to cause opening of the latch 45 for washing, rinsing, sanitizing, and drying of all of the egg contacting units.

When one of the switches 98 is operated for movement of the latch trip cam 101, the system controlling the cylinder 102 will keep the cam extended until the system is reset for control by the next approaching unit 13. As the next succeeding unit 13 approaches one of the switch arms 99 and 100, the system will be reset by engagement of the pin 95 adjacent thereto on the mounting ring 12, with the actuator arm 98a of the switch 98b. Operation of the switch 98b will reactuate the pneumatic system to withdraw the latch trip cam 101. This resets the system so that each succeeding unit 13 individually controls the latch trip cam system for selective washing of the units.

It will be readily observed that by following the method of this invention, egg product processing may be effected continuously without interruption when it is desired to cleanse any or all of the individual heads of the mechanism.

The track 15 has a rise 15a therein between the pan stations so that the stations may be individually segmented and the unit will rise above the walls thereof as it passes from one to the other. As the unit approaches the end of the last of the cleansing stations, the roller 46 rides up the final rise 15b to such a vertical position that the latch 45 thereof is reclosed to latch and hold the unit.

Following relatching of the unit, the unit approaches a cup reset cam 108 and a head closing cam 109. The head closing cam 109 is engaged on its upper surface by the follower 63 for repositioning and partially rotating the shafts 22 of the clamping and breaking head subassemblies to bring the cup halves 19 and knife portions 20 back together to form a complete cup and breaking knife arrangement with the clamping flanges 21 disposed parallel and adjacent to each other for commencement of recycling of the entire machine.

The cam 108 also is effective to re-establish the original position of the egg contacting elements including the cups 34 and 35 which had been rotated by engagement of the followers 73 and 74 through engagement thereof with the respective selective dumping cams 84, 90, and 92 for the yolk and 85, 93, and 94 for the white. When these cups were rotated for dumping, they were held in their dump position by a toggle arrangement 110 and 111, respectively. As the unit approaches cup reset cam 108, however, a follower 112 engages the same to ride on the upper surface thereof. This follower is disposed on a crank 113 which is connected by a shaft to a second crank 114, the free end of which is pivotally connected to an upwardly spring biased link 115 having rearwardly projecting pins 116 disposed so that downward movement of the link 115, which occurs as the follower 112 rides on the surface of the cup reset cam 108, will reverse the position of the toggles 110 and 111 and rerotate the shafts 71 and 72 to their normal position with the cups 34 and 35 opening upwardly. This completes the cycle of operation of a single head and reprepares the same to start a complete recycle moving counter-clockwise from the starting position 50.

It will also be appreciated that numerous other modifications and variations may be effected within the true spirit and scope of the novel concepts and principles of this invention and without departing therefrom.

We claim:

1. A method of handling egg products, comprising clamping an egg shell by gripping the same at a plurality of points on the surface thereof at opposed portions thereof, sharply cutting the shell between the opposed portions while controllably limiting the depth of penetration of cutting elements into the shell to a predetermined depth during cutting of the shell, separating the opposed portions of the shell, emptying the contents of the shell therefrom into the uppermost of a pair of vertically aligned containers to receive the same, which uppermost container is smaller in volume than the total contents of said shell whereby the egg white overflows the upper container and is separated from the egg yolk while flowing from the upper container into the lower container, and repeatedly cutting from the egg yolk, along the edge of the upper container, egg white disposed about the egg yolk to reduce the quantity of egg white clinging to the egg yolk, thereby increasing the proportion of egg yolk solids in the total of egg yolk and egg white remaining in the upper container.

2. A method of blending egg products including egg whites and egg yolks to selected predetermined levels of solids content by providing a plurality of egg breaking units having egg white and egg yolk separating and receiving elements and a plurality of egg breaking units with whole egg receiving elements, successively depositing eggs individually in said units, clamping the shell of each egg by gripping the same at a plurality of points on the surface thereof at opposed portion thereof, sharply cutting the shell between the opposed portions, separating the opposed portions of the shell and empty the contents of the shell therefrom into the selected receiving elements on each of said units, and washing all the egg contacting elements of selected units.

References Cited by the Examiner

UNITED STATES PATENTS

| | | | |
|---|---|---|---|
| 1,985,320 | 12/34 | Giveen | 146—2 |
| 2,523,301 | 9/50 | Hodson et al. | 146—2 |
| 2,718,906 | 9/55 | Adams et al. | 146—2 |
| 2,815,055 | 12/57 | Willsey | 146—2 |
| 2,966,184 | 12/60 | Willsey | 146—2 |
| 3,082,804 | 3/63 | Shelton | 146—2 |

J. SPENCER OVERHOLSER, *Primary Examiner.*

CARL W. ROBINSON, FRANK H. BRONAUGH,
*Examiners.*